(12) United States Patent
Fu

(10) Patent No.: US 7,246,645 B2
(45) Date of Patent: Jul. 24, 2007

(54) TIRE CHAIN ASSEMBLY OPERATED EASILY

(76) Inventor: Yang-Chen Fu, 6F, No. 2, Sec. 3, Min Sheng E. Rd., Taipei (TW)

( * ) Notice: Subject to any disclaimer, the term of this patent is extended or adjusted under 35 U.S.C. 154(b) by 168 days.

(21) Appl. No.: 11/100,821

(22) Filed: Apr. 7, 2005

(65) Prior Publication Data

US 2006/0225823 A1    Oct. 12, 2006

(51) Int. Cl.
*B60C 11/00* (2006.01)

(52) U.S. Cl. ........................ 152/219; 152/221

(58) Field of Classification Search ................ 152/171, 152/172, 173, 178, 179, 185.1, 187, 188, 152/190, 191, 213 A, 213 R, 217, 219, 221
See application file for complete search history.

(56) References Cited

U.S. PATENT DOCUMENTS

| | | | | |
|---|---|---|---|---|
| 2,074,616 A | * | 3/1937 | Martel | 152/213 A |
| 2,707,411 A | * | 5/1955 | St Pierre | 81/15.8 |
| 4,282,916 A | * | 8/1981 | Carlson | 152/241 |
| 5,776,271 A | * | 7/1998 | Sakuma et al. | 152/213 R |
| 6,230,772 B1 | * | 5/2001 | Fu | 152/172 |
| 6,345,653 B1 | * | 2/2002 | Fu | 152/219 |
| 6,675,850 B2 | * | 1/2004 | Sakuma | 152/221 |

* cited by examiner

*Primary Examiner*—Russell D. Stormer
*Assistant Examiner*—Kip Kotter
(74) *Attorney, Agent, or Firm*—Alan Kamrath; Kamrath & Associates PA

(57) ABSTRACT

A tire chain assembly includes a chain body having a first side provided with a first snapping member and a second snapping member detachably engaged with the first snapping member and a second side provided with a snapping hole and a rotation locking mechanism detachably locked on the snapping hole. The rotation locking mechanism includes a connecting plate, a snapping member, and a locking hook. Thus, the chain body is directly enclosed around the tire of a car without needing aid of a jack and without having to move the car, so that the tire chain assembly is mounted on the tire easily, thereby facilitating a user operating the tire chain assembly.

11 Claims, 8 Drawing Sheets

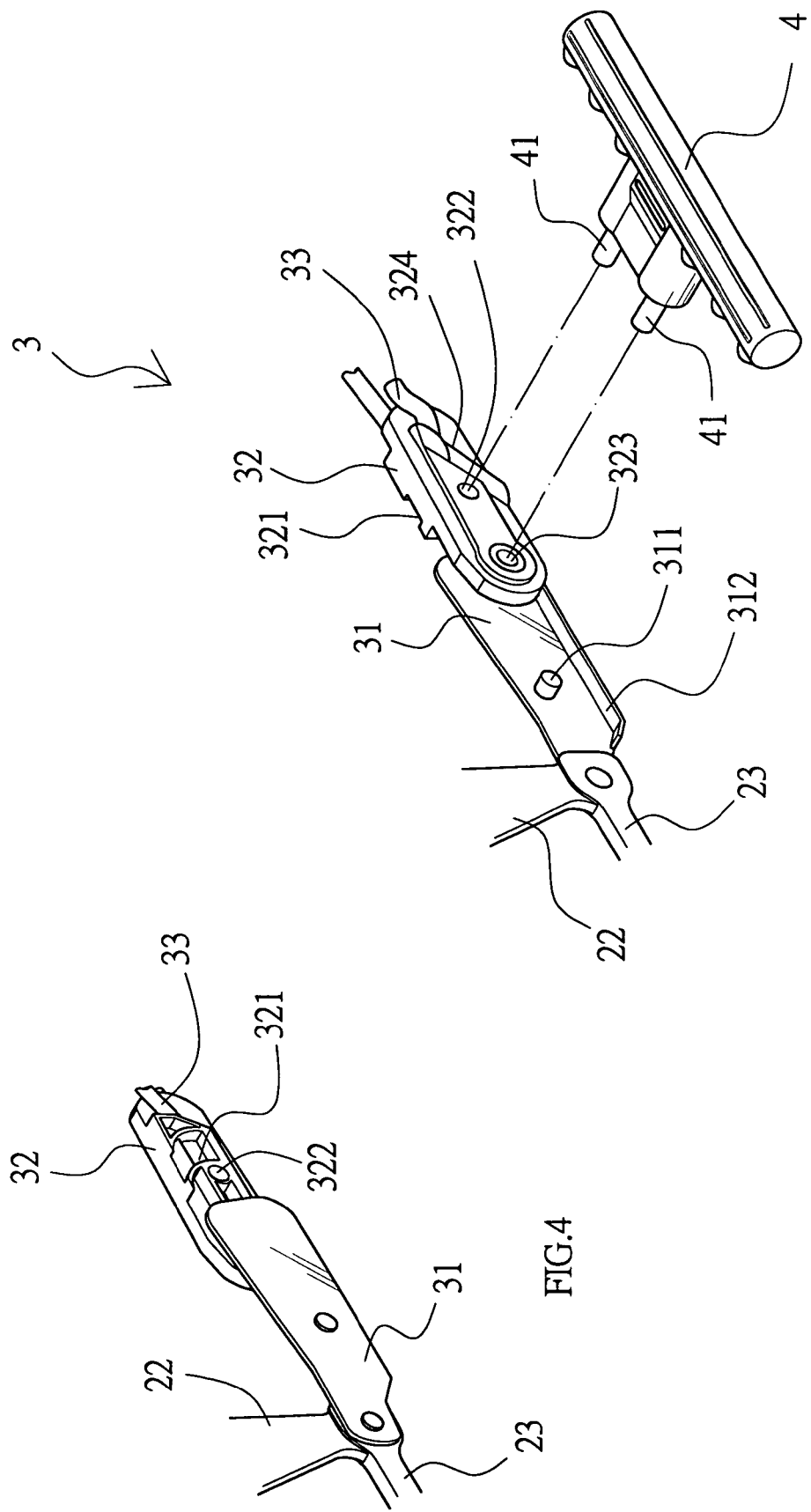

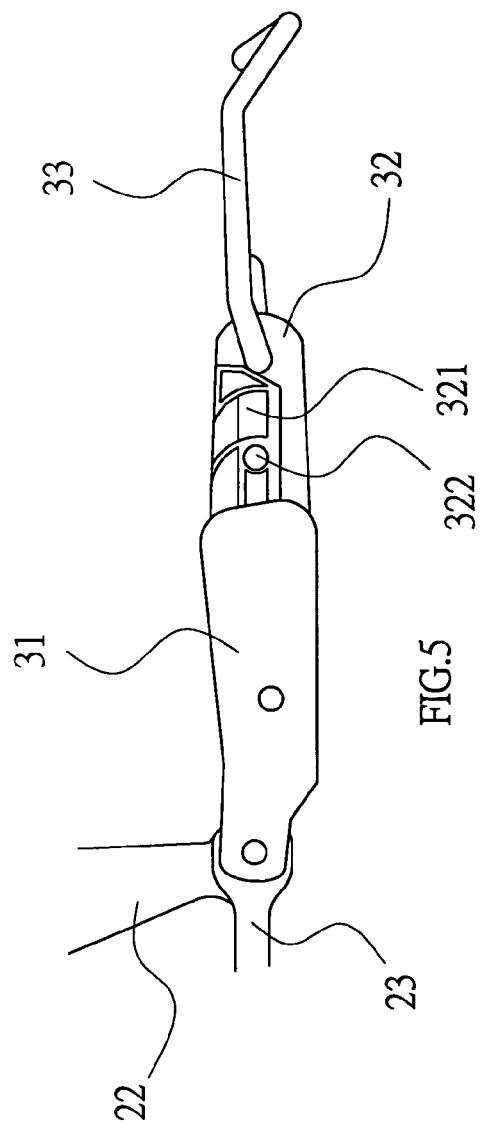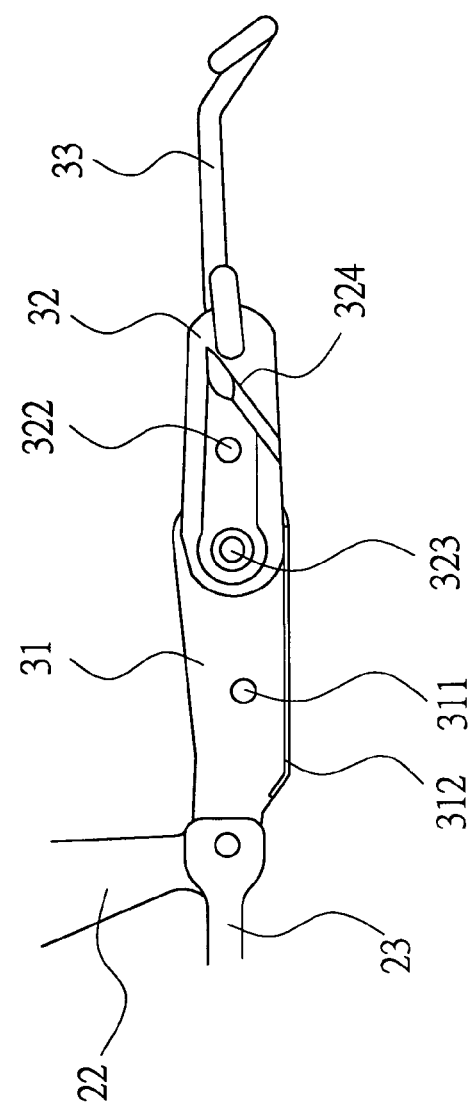

TIRE CHAIN ASSEMBLY OPERATED EASILY

BACKGROUND OF THE INVENTION

1. Field of the Invention

The present invention relates to a tire chain assembly, and more particularly to a tire chain assembly which is operated easily and conveniently without needing aid of a jack.

2. Description of the Related Art

A conventional tire chain is mounted on the tire of a car to provide an ant-slip effect on a snowy ground. In assembly, the tire is lifted by a jack so that the tire chain is located under the tire so as to mount the tire chain on the tire. Alternatively, the tire chain is fully expanded on the ground. Then, the car is moved forward to locate the tire chain under the tire so as to mount the tire chain on the tire. However, the tire chain cannot be mounted on the tire easily and conveniently, thereby causing inconvenience to a user when mounting the tire chain on the tire.

SUMMARY OF THE INVENTION

The primary objective of the present invention is to provide a tire chain assembly which is operated easily and conveniently without needing aid of a jack.

Another objective of the present invention is to provide a tire chain assembly, wherein the chain body is directly enclosed around the tire of a car without needing aid of a jack and without having to move the car, so that the tire chain assembly is mounted on the tire easily, thereby facilitating a user operating the tire chain assembly.

A further objective of the present invention is to provide a tire chain assembly, wherein the tire chain assembly is locked and unlocked by rotation of the driving member so that the tire chain assembly is mounted on and detached from the tire easily and rapidly, thereby facilitating the user mounting and detaching the tire chain assembly.

Further benefits and advantages of the present invention will become apparent after a careful reading of the detailed description with appropriate reference to the accompanying drawings.

BRIEF DESCRIPTION OF THE DRAWINGS

FIG. 3 is a partially exploded perspective view showing a rotation locking mechanism of the tire chain assembly as shown in FIG. 1;

FIG. 4 is a perspective view of the rotation locking mechanism of the tire chain assembly as shown in FIG. 3;

FIG. 5 is a plan view of the rotation locking mechanism of the tire chain assembly as shown in FIG. 4;

FIG. 6 is a plan view of the rotation locking mechanism of the tire chain assembly as shown in FIG. 4;

DETAILED DESCRIPTION OF THE INVENTION

Figure 1:
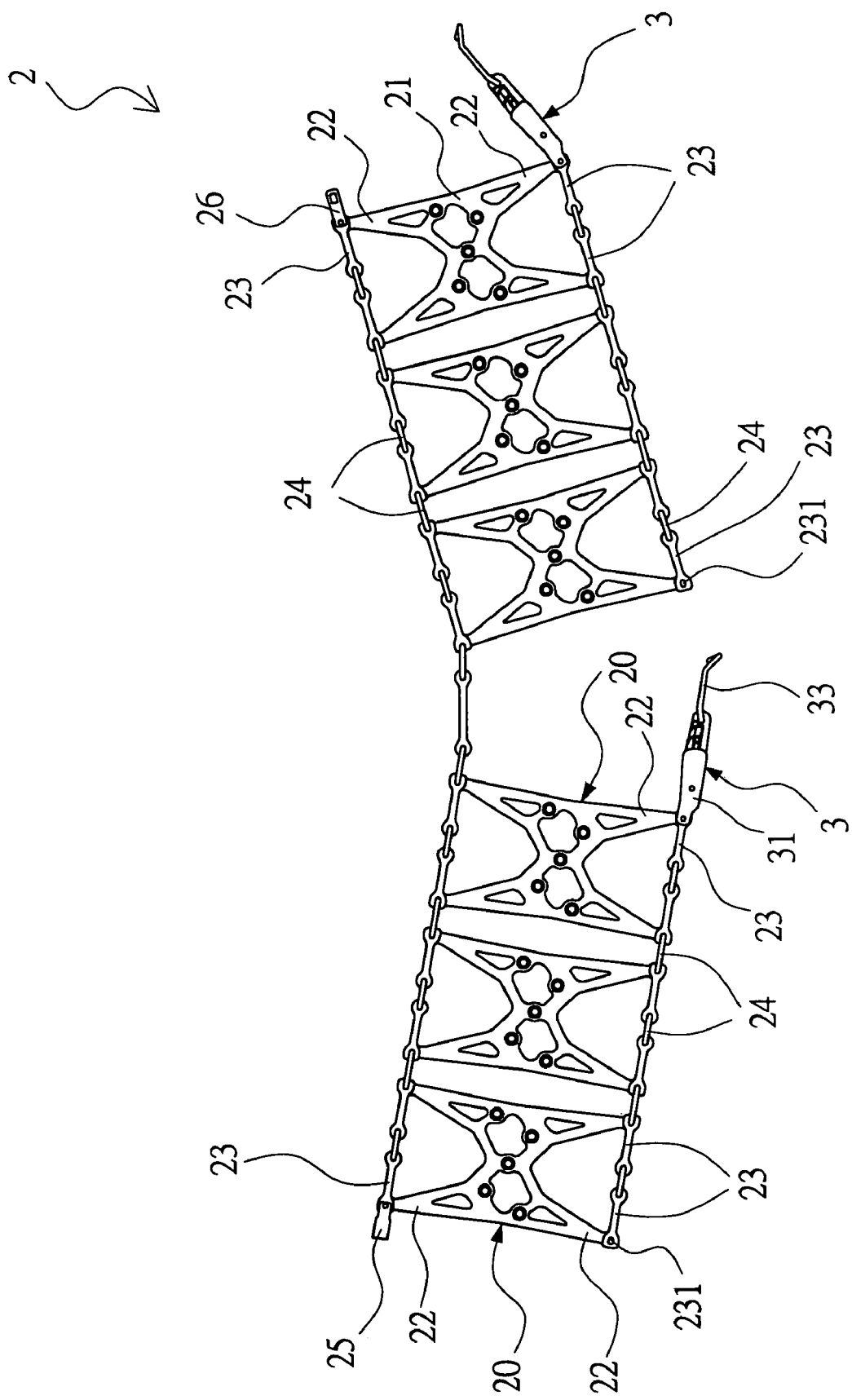
FIG. 1 is a plan view of a tire chain assembly in accordance with the preferred embodiment of the present invention.
Figure 2:
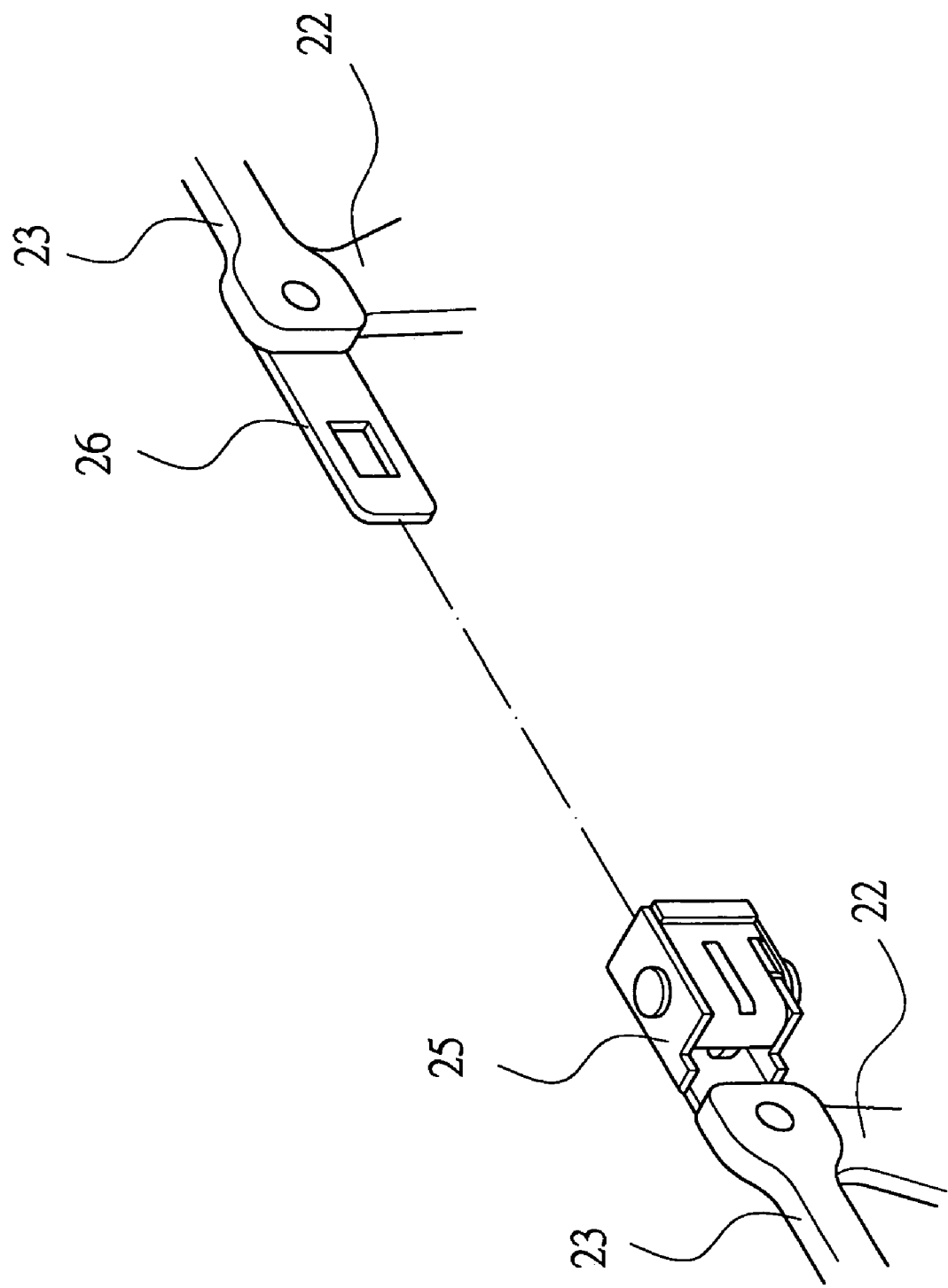
FIG. 2 is a partially exploded perspective view showing a first snapping member and a second snapping member of the tire chain assembly as shown in FIG. 1.

Referring to the drawings and initially to FIGS. 1 and 2, a tire chain assembly in accordance with the preferred embodiment of the present invention comprises a chain body 2 including a plurality of net-shaped plates 20 connected with each other. The net-shaped plates 20 are connected with each other by a plurality of connecting members 24. Each of the net-shaped plates 20 includes a net body 21 having a plurality of extension arms 22, and a plurality of connecting arms 23 each having a first end pivotally connected with a respective one of the extension arms 22 of the net body 21 and a second end pivotally connected with a respective one of the connecting members 24.

The chain body 2 has a first side having a first end provided with a first snapping member 25 and a second end provided with a second snapping member 26 detachably engaged with the first snapping member 25. The chain body 2 has a second side having a first end provided with a snapping hole 231 formed in the respective connecting arm 23 and a second end provided with a rotation locking mechanism 3 detachably locked on the snapping hole 231. The second side of the chain body 2 has a separated mediate portion having a first section provided with the snapping hole 231 and a second section provided with the rotation locking mechanism 3.

Referring to FIGS. 1-6, the rotation locking mechanism 3 includes a connecting plate 31 pivotally mounted on the respective net-shaped plate 20, a snapping member 32 rotatably mounted on the connecting plate 31, a locking hook 33 pivotally mounted on the snapping member 32 and detachably locked on the snapping hole 231 of the respective connecting arm 23, and a driving member 4 mounted on the snapping member 32 for driving the snapping member 32 to rotate relative to the connecting plate 31 to change a distance between the connecting plate 31 and the snapping member 32 and a distance between the connecting plate 31 and the locking hook 33.

The connecting plate 31 of the rotation locking mechanism 3 has a first end pivotally mounted on the respective connecting arm 23 of the respective net-shaped plate 20 and has a mediate portion provided with a locking post 311. The connecting plate 31 of the rotation locking mechanism 3 has an edge provided with an elongated stop wall 312.

The snapping member 32 of the rotation locking mechanism 3 has a first end pivotally mounted on a second end of the connecting plate 31 and has a mediate portion formed with a stepped locking groove 321 that is movable to lock the locking post 311 of the connecting plate 31. The first end of the snapping member 32 is formed with a through hole 323 and a through bore 322 spaced from the through hole 323 and located adjacent to the mediate portion of the snapping member 32. The through hole 323 of the snapping member 32 is located at a center of rotation of the first end of the snapping member 32 and the second end of the connecting plate 31. The snapping member 32 of the rotation locking mechanism 3 has an edge provided with a stop portion 324 that is movable to rest on the stop wall 312 of the connecting plate 31.

The locking hook 33 of the rotation locking mechanism 3 has a first end pivotally mounted on a second end of the snapping member 32 and a second end detachably locked in the snapping hole 231.

The driving member 4 of the rotation locking mechanism 3 has two driving posts 41 each respectively inserted into the through hole 323 and the through bore 322 of the snapping member 32 for driving the snapping member 32 to rotate relative to the connecting plate 31.

Figure 7:
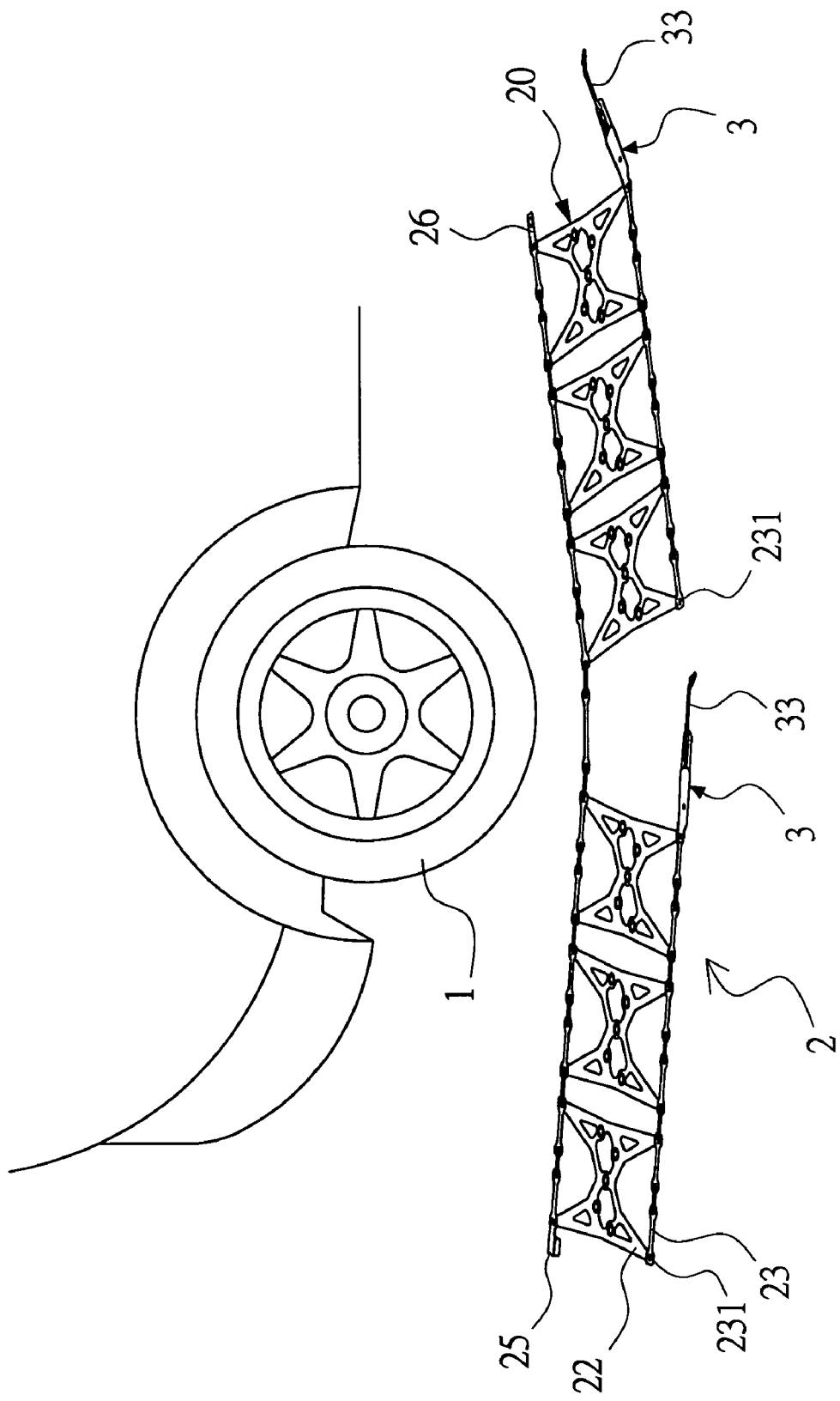
FIG. 7 is a schematic perspective operational view of the tire chain assembly as shown in FIG. 1.
Figure 8:
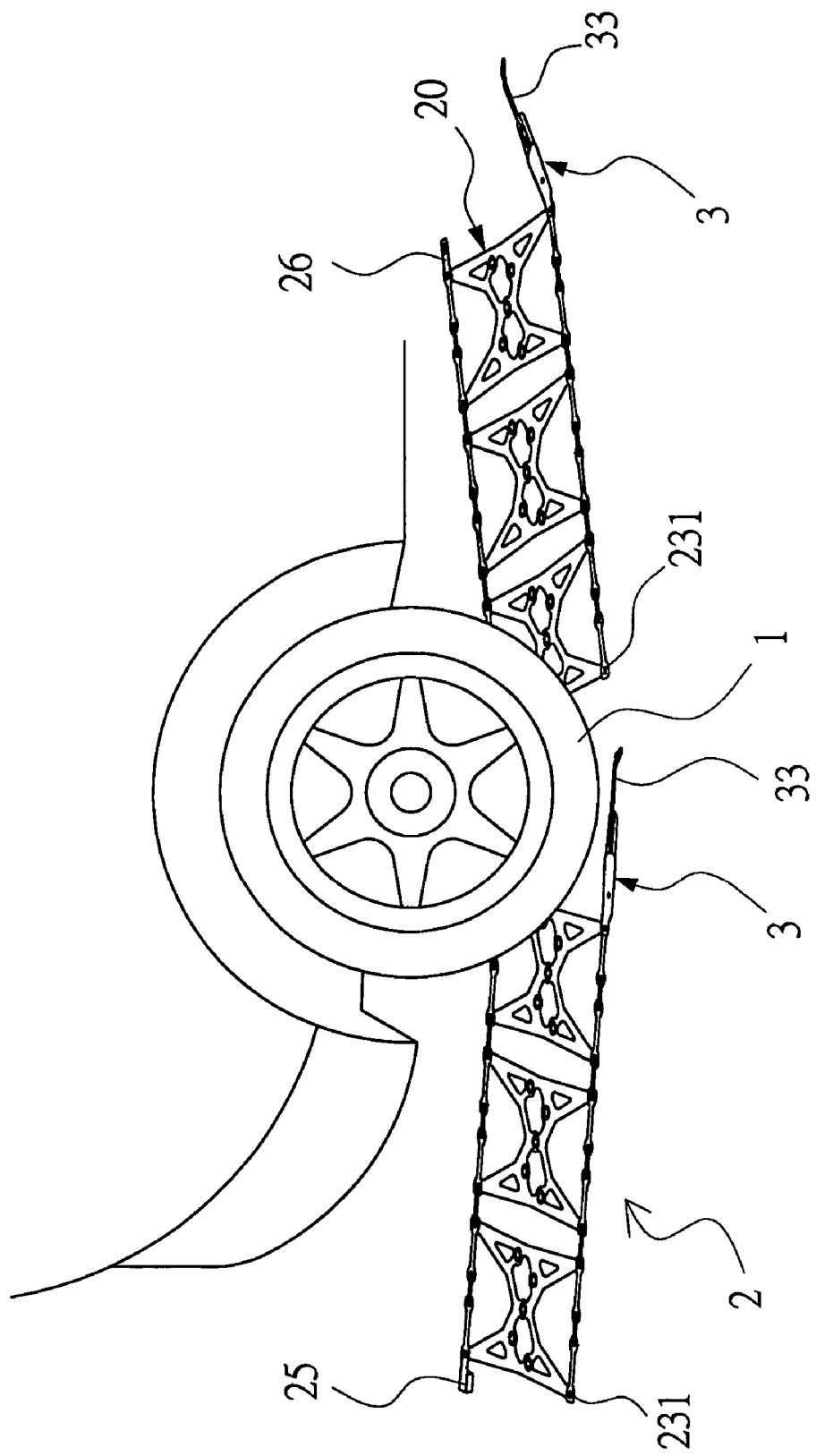
FIG. 8 is a schematic perspective operational view of the tire chain assembly as shown in FIG. 7.

In operation, referring to FIGS. 7 and 8 with reference to FIGS. 1-6, the chain body 2 is fully expanded in a planar manner. At this time, the locking hook 33 of the rotation locking mechanism 3 at the mediate portion of the second side of the chain body 2 is not snapped onto the snapping hole 231 of the respective connecting arm 23, so that the mediate portion of the second side of the chain body 2 is initially disposed at a separated state. Then, the chain body 2 is mounted on a tire 1, with the mediate portion of the chain body 2 encompassing the bottom of the tire 1. Then, the second snapping member 26 at the first side of the chain body 2 is engaged with the first snapping member 25 so that the first side of the chain body 2 forms a circular shape. Then, the locking hook 33 of the rotation locking mechanism 3 at the second side of the chain body 2 is snapped onto the snapping hole 231 of the respective connecting arm 23, so that so that the second side of the chain body 2 forms a circular shape, thereby mounting the chain body 2 on the tire.

Figure 9:
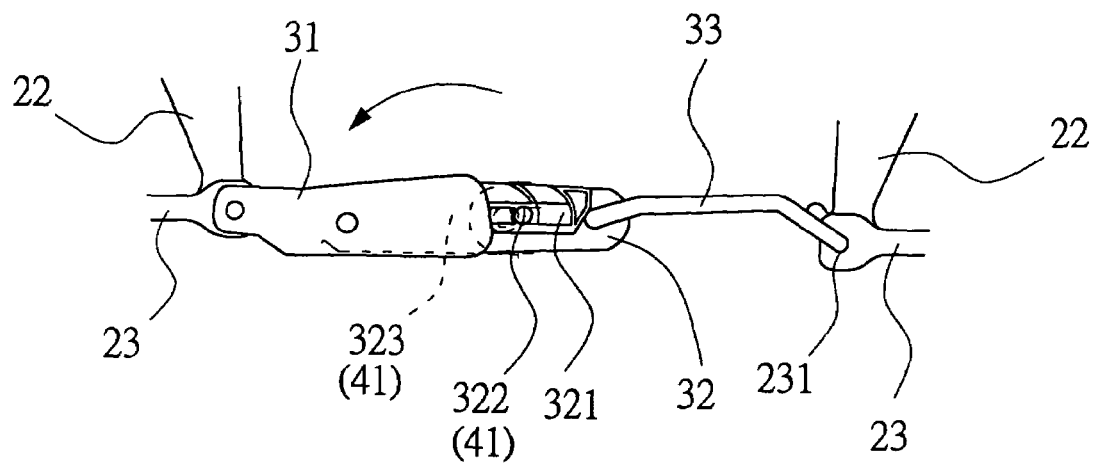
FIG. 9 is a schematic plan operational view of the rotation locking mechanism of the tire chain assembly as shown in FIG. 5.
Figure 10:
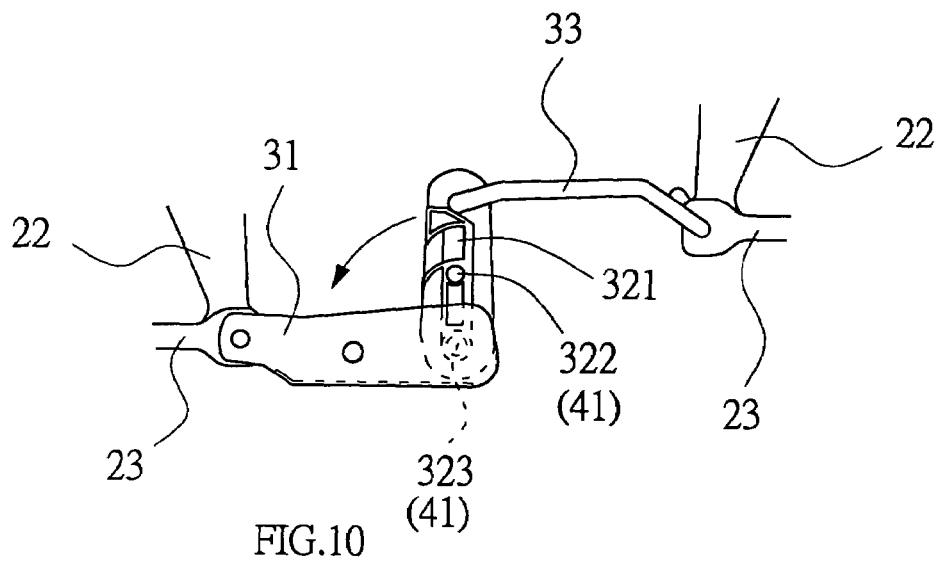
FIG. 10 is a schematic plan operational view of the rotation locking mechanism of the tire chain assembly as shown in FIG. 9.
Figure 11:
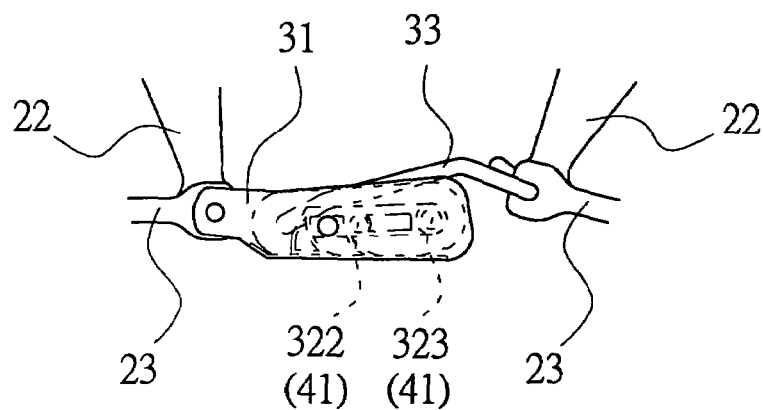
FIG. 11 is a schematic plan operational view of the rotation locking mechanism of the tire chain assembly as shown in FIG. 10.

Referring to FIGS. 9-11 with reference to FIGS. 1-6, after the locking hook 33 of the rotation locking mechanism 3 is snapped onto the snapping hole 231 of the respective connecting arm 23, the snapping member 32 is driven by the driving member 4 to rotate toward the connecting plate 31 to drive the locking hook 33 to move toward the connecting plate 31 to reduce the distance between the connecting plate 31 and the locking hook 33 so as to tighten the tire 1. After the snapping member 32 is in line with and fully hidden in the connecting plate 31, the locking post 311 of the connecting plate 31 is inserted into and locked in the locking groove 321 of the snapping member 32 so as to lock the locking hook 33 of the rotation locking mechanism 3 on the snapping hole 231 of the respective connecting arm 23, so that the rotation locking mechanism 3 is locked as shown in FIG. 11. At this time, the stop portion 324 of the snapping member 32 is stopped by the stop wall 312 of the connecting plate 31, thereby preventing the snapping member 32 from being loosened from the connecting plate 31.

Figure 12:
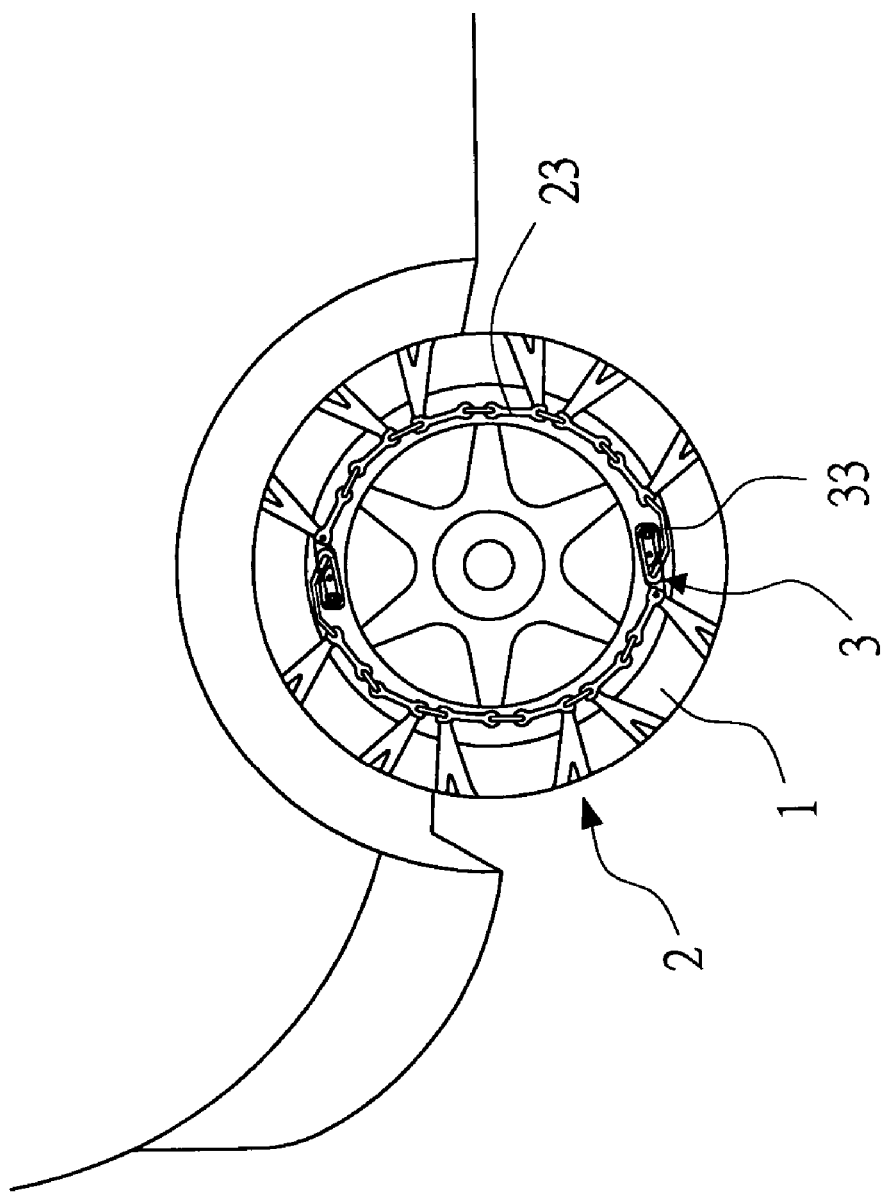
FIG. 12 is a schematic perspective operational view of the tire chain assembly as shown in FIG. 8.

Referring to FIG. 12, the chain body 2 is locked by the rotation locking mechanism 3, so that the chain body 2 is enclosed around the tire 1 closely.

Accordingly, the chain body 2 is directly enclosed around the tire 1 of a car without needing aid of a jack and without having to move the car, so that the tire chain assembly is mounted on the tire 1 easily, thereby facilitating a user operating the tire chain assembly. In addition, the tire chain assembly is locked and unlocked by rotation of the driving member 4 so that the tire chain assembly is mounted on and detached from the tire 1 easily and rapidly, thereby facilitating the user mounting and detaching the tire chain assembly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A tire chain assembly, comprising:
    a chain body including a plurality of net-shaped plates connected with each other;
    the chain body having a first side having a first end provided with a first snapping member and a second end provided with a second snapping member detachably engaged with the first snapping member and a second side having a first end provided with a snapping hole and a second end provided with a rotation locking mechanism detachably locked on the snapping hole; wherein
    the rotation locking mechanism includes:
    a connecting plate pivotally mounted on the respective net-shaped plate;
    a snapping element rotatably mounted on the connecting plate;
    a locking hook pivotally mounted on the snapping element and detachably locked on the snapping hole;
    wherein the connecting plate of the rotation locking mechanism has a mediate portion provided with a locking post, and the snapping element of the rotation locking mechanism has a mediate portion formed with a stepped locking groove that is movable to lock the locking post of the connecting plate.

2. The tire chain assembly in accordance with claim 1, wherein the connecting plate of the rotation locking mechanism has an edge provided with an elongated stop wall, and the snapping element of the rotation locking mechanism has an edge provided with a stop portion that is movable to rest on the stop wall of the connecting plate.

3. The tire chain assembly in accordance with claim 1, wherein when the snapping element is in line with and fully hidden in the connecting plate, the locking post of the connecting plate is inserted into and locked in the locking groove of the snapping element so as to lock the locking hook of the rotation locking mechanism on the snapping hole.

4. The tire chain assembly in accordance with claim 1, wherein the locking hook of the rotation locking mechanism has a first end pivotally mounted on a second end of the snapping element and a second end detachably locked in the snapping hole.

5. The tire chain assembly in accordance with claim 1, wherein the second side of the chain body has a separated mediate portion having a first section provided with the snapping hole and a second section provided with the rotation locking mechanism.

6. The tire chain assembly in accordance with claim 1, wherein the net-shaped plates are connected with each other by a plurality of connecting members.

7. The tire chain assembly in accordance with claim 6, wherein each of the net-shaped plates includes a net body having a plurality of extension arms, and a plurality of connecting arms each having a first end pivotally connected with a respective one of the extension arms of the net body and a second end pivotally connected with a respective one of the connecting members.

8. The tire chain assembly in accordance with claim 7, wherein the snapping hole is formed in the respective connecting arm.

9. A tire chain assembly, comprising:
    a chain body including a plurality of net-shaped plates connected with each other;

the chain body having a first side having a first end provided with a first snapping member and a second end provided with a second snapping member detachably engaged with the first snapping member and a second side having a first end provided with a snapping hole and a second end provided with a rotation locking mechanism detachably locked on the snapping hole; wherein the rotation locking mechanism includes:

a connecting plate pivotally mounted on the respective net-shaped plate;

a snapping element rotatably mounted on the connecting plate;

a locking hook pivotally mounted on the snapping element and detachably locked on the snapping hole;

wherein the connecting plate of the rotation locking mechanism has a first end pivotally mounted on the respective net-shaped plate, and the snapping element of the rotation locking mechanism has a first end pivotally mounted on a second end of the connecting plate;

wherein the first end of the snapping element is formed with a through hole and a through bore spaced from the through hole and located adjacent to a mediate portion of the snapping element;

wherein the rotation locking mechanism further includes a driving member mounted on the snapping element for driving the snapping element to rotate relative to the connecting plate to change a distance between the connecting plate and the snapping element and a distance between the connecting plate and the locking hook;

wherein the driving member of the rotation locking mechanism has two driving posts each respectively inserted into the through hole and the through bore of the snapping element for driving the snapping element to rotate relative to the connecting plate.

10. The tire chain assembly in accordance with claim 9, wherein the through hole of the snapping element is located at a center of rotation of the first end of the snapping element and the second end of the connecting plate.

11. The tire chain assembly in accordance with claim 9, wherein the snapping element is driven by the driving member to rotate toward the connecting plate to drive the locking hook to move toward the connecting plate to reduce the distance between the connecting plate and the locking hook.

* * * * *